US012508503B2

(12) United States Patent
Liu (10) Patent No.: US 12,508,503 B2
(45) Date of Patent: Dec. 30, 2025

(54) RENDERING PROCESSING METHOD AND ELECTRONIC DEVICE

(71) Applicant: NETEASE (HANGZHOU) NETWORK CO., LTD., Zhejiang (CN)

(72) Inventor: Zhongyuan Liu, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 403 days.

(21) Appl. No.: 18/041,218

(22) PCT Filed: Feb. 22, 2021

(86) PCT No.: PCT/CN2021/077307
§ 371 (c)(1),
(2) Date: Feb. 10, 2023

(87) PCT Pub. No.: WO2022/033009
PCT Pub. Date: Feb. 17, 2022

(65) Prior Publication Data
US 2023/0338842 A1  Oct. 26, 2023

(30) Foreign Application Priority Data
Aug. 11, 2020 (CN) .......................... 202010803958.X (51) Int. Cl.
*A63F 13/52* (2014.01)
*G06T 15/00* (2011.01)

(52) U.S. Cl.
CPC ............ *A63F 13/52* (2014.09); *G06T 15/005* (2013.01); *A63F 2300/66* (2013.01)

(58) Field of Classification Search
CPC ..... A63F 13/52; A63F 2300/66; G06T 15/005
See application file for complete search history.

(56) References Cited

U.S. PATENT DOCUMENTS 6,208,347 B1 * 3/2001 Migdal ................... G06T 15/00
345/419
6,448,968 B1 * 9/2002 Pfister ..................... G06T 17/00
345/619

(Continued)

FOREIGN PATENT DOCUMENTS

CN 101794462 A 8/2010
CN 102752549 A 10/2012

(Continued)

OTHER PUBLICATIONS

International Search Report dated May 19, 2021 of International Application No. PCT/CN2021/077307.

(Continued)

*Primary Examiner* — Chase E Leichliter
(74) *Attorney, Agent, or Firm* — Qinghong Xu (57) ABSTRACT

A rendering processing method and apparatus, an electronic device and a storage medium. The method comprises: acquiring a virtual model, the virtual model comprising a display grid and a simulation grid, wherein the number of vertices of the simulation grid is less than the number of vertices of the display grid (101); in response to a deformation event that triggers the virtual model to deform, and according to the deformation event, determining vertex position parameters of the simulation grid (102); determining target mapping information that corresponds to the target vertex of the display grid (103); according to the target mapping information and the vertex position parameter of the simulation grid, determining target vertex position information of the display grid (104); and rendering the display grid according to the target vertex position information (105).

18 Claims, 4 Drawing Sheets

(56) References Cited

U.S. PATENT DOCUMENTS

| | | | |
|---|---|---|---|
| 10,275,922 B2* | 4/2019 | Pan | G06T 13/40 |
| 10,984,587 B2* | 4/2021 | Duka | A63F 13/85 |
| 11,607,611 B2* | 3/2023 | St-Pierre | A63F 13/52 |
| 2005/0280646 A1 | 12/2005 | Wang et al. | |
| 2010/0091018 A1* | 4/2010 | Tatarchuk | G06T 15/005 |
| | | | 345/473 |
| 2011/0012901 A1* | 1/2011 | Kaplanyan | G06T 15/506 |
| | | | 345/426 |
| 2013/0106834 A1* | 5/2013 | Curington | G06T 9/00 |
| | | | 345/419 |
| 2013/0314410 A1 | 11/2013 | Gravois et al. | |
| 2016/0171765 A1* | 6/2016 | Mehr | G06T 17/20 |
| | | | 345/419 |
| 2017/0161948 A1* | 6/2017 | Hua | A41H 1/02 |
| 2018/0182152 A1* | 6/2018 | Pan | G06T 17/205 |
| 2018/0240262 A1* | 8/2018 | Hagedoorn | G06T 13/80 |
| 2023/0338842 A1* | 10/2023 | Liu | A63F 13/52 |

FOREIGN PATENT DOCUMENTS

| | | |
|---|---|---|
| CN | 102831280 A | 12/2012 |
| CN | 103902747 A | 7/2014 |
| CN | 105354879 A | 2/2016 |
| CN | 106547964 A | 3/2017 |
| CN | 106960459 A | 7/2017 |
| CN | 111028320 A | 4/2020 |
| CN | 111773707 A | 10/2020 |
| KR | 20100062832 A | 6/2010 |

OTHER PUBLICATIONS

1st Office Action dated Oct. 27, 2023 of Chinese Application No. 202010803958.X.

* cited by examiner

| Acquire a virtual model, the virtual model including a display grid and a simulation grid, and the number of vertices of the simulation grid being less than the number of vertices of the display grid; | 301 |

| Generate target mapping information corresponding to a target vertex of the display grid, the target mapping information being information for a target mapping point of a target sub-grid in the simulation grid; | 302 |

RENDERING PROCESSING METHOD AND ELECTRONIC DEVICE

CROSS-REFERENCE TO RELATED APPLICATIONS

The present application is the U.S. national phase application of PCT Application No. PCT/CN2021/077307, filed Feb. 22, 2021, which claims the priority to the Chinese Patent application Ser. No. 202010803958.X, entitled "RENDERING PROCESSING METHOD AND APPARATUS, ELECTRONIC DEVICE AND STORAGE MEDIUM", filed Aug. 11, 2020, and the entire contents of which are hereby incorporated by reference in their entirety.

TECHNICAL FIELD

The present disclosure relates to the technical field of image processing, and in particular, to a rendering processing method and apparatus, an electronic device, and a storage medium.

BACKGROUND

At present, the use of cloth involved in games is gradually increasing. For cloth simulation, in general, simulation calculation is directly performed on vertices on a rendering grid of the cloth to obtain rendering positions, so as to subsequently produce a cloth simulation effect.

However, because the number of the vertices on the rendering grid of the cloth is very large, an amount of the simulation calculation of the rendering grid in the game will be large, especially when a computing capability of a mobile phone is relatively weak, the large amount of the simulation calculation will cause the game lag.

SUMMARY

One of embodiments of the present disclosure provides a rendering processing method, and the method includes:
  acquiring a virtual model, wherein the virtual model includes a display grid and a simulation grid, and the number of vertices of the simulation grid is less than the number of vertices of the display grid;
  in response to a deformation event that triggers the virtual model to deform, determining a vertex position parameter of the simulation grid according to the deformation event;
  determining target mapping information that corresponds to a target vertex of the display grid, wherein the target mapping information is information for a target mapping point of a target sub-grid in the simulation grid;
  determining target vertex position information of the display grid according to the target mapping information and the vertex position parameter of the simulation grid; and
  rendering the display grid according to the target vertex position information.

Optionally, the determining the target vertex position information of the display grid according to the target mapping information and the vertex position parameter of the simulation grid includes:
  determining target mapping point position information of the target mapping point according to the target mapping information and the vertex position parameter of the simulation grid;
  determining a target distance vector from the target mapping information, wherein the target distance vector is a distance vector between the target vertex and the target mapping point; and
  determining the target vertex position information of the display grid according to the target distance vector and the target mapping point position information.

Optionally, the determining the target vertex position information of the display grid according to the target distance vector and the target mapping point position information includes:
  determining a target normal vector for the target sub-grid; and
  determining the target vertex position information of the display grid in combination with the target normal vector, the target distance vector, and the target mapping point position information.

Optionally, the determining the target mapping point position information of the target mapping point according to the target mapping information and the vertex position parameter of the simulation grid includes:
  determining a target sub-grid index from the target mapping information, wherein the target sub-grid index is a sub-grid index corresponding to the target sub-grid in the simulation grid; and
  determining the target mapping point position information of the target mapping point according to the target sub-grid index and the vertex position parameter of the simulation grid.

Optionally, the determining the target mapping point position information of the target mapping point according to the target sub-grid index and the vertex position parameter of the simulation grid includes:
  determining a target barycentric coordinate from the target mapping information, wherein the target barycentric coordinate is a barycentric coordinate corresponding to the target mapping point in the target sub-grid; and
  determining the target mapping point position information of the target mapping point in the target sub-grid in combination with the target sub-grid index, the target barycentric coordinate and the vertex position parameter of the simulation grid.

One of the embodiments of the present disclosure provides a rendering processing method, and the method includes:
  acquiring a virtual model, wherein the virtual model includes a display grid and a simulation grid, and the number of vertices of the simulation grid is less than the number of vertices of the display grid; and
  generating target mapping information corresponding to a target vertex of the display grid, wherein the target mapping information is information for a target mapping point of a target sub-grid in the simulation grid.

Optionally, the target mapping information includes a target sub-grid index corresponding to the target sub-grid, and the generating the target mapping information corresponding to the target vertex of the display grid includes:
  determining the target sub-grid corresponding to the target vertex of the display grid in the simulation grid; and
  determining the target sub-grid index corresponding to the target sub-grid.

Optionally, the determining the target sub-grid corresponding to the target vertex of the display grid in the simulation grid includes:

for the target vertex of the display grid, determining distance information corresponding to a sub-grid in the simulation grid; and determining a sub-grid corresponding to the smallest distance information as the target sub-grid corresponding to the target vertex of the display grid.

Optionally, the target mapping information includes a target barycentric coordinate corresponding to the target mapping point, and the generating the target mapping information corresponding to the target vertex of the display grid includes:

determining the target mapping point corresponding to the target vertex in the target sub-grid; and determining the target barycentric coordinate corresponding to the target mapping point.

Optionally, the target mapping information includes a target distance vector between the target vertex and the target mapping point, and the generating the target mapping information corresponding to the target vertex of the display grid includes:

determining the target distance vector between the target vertex and the target mapping point.

One of the embodiments of the present disclosure provides a rendering processing apparatus, and the apparatus includes:

a first virtual model acquiring module, configured to acquire a virtual model, wherein the virtual model includes a display grid and a simulation grid, and the number of vertices of the simulation grid is less than the number of vertices of the display grid;

a simulation grid vertex position parameter determining module, configured to, in response to a deformation event that triggers the virtual model to deform, determine a vertex position parameter of the simulation grid according to the deformation event;

a target mapping information determining module, configured to determine target mapping information that corresponds to a target vertex of the display grid, wherein the target mapping information is information for a target mapping point of a target sub-grid in the simulation grid;

a target vertex position information determining module, configured to determine target vertex position information of the display grid according to the target mapping information and the vertex position parameter of the simulation grid; and a display grid rendering module, configured to render the display grid according to the target vertex position information.

One of the embodiments of the present disclosure provides a rendering processing apparatus, and the apparatus includes:

a second virtual model acquiring module, configured to acquire a virtual model, wherein the virtual model includes a display grid and a simulation grid, and the number of vertices of the simulation grid is less than the number of vertices of the display grid; and a target mapping information generating module, configured to generate target mapping information corresponding to a target vertex of the display grid, wherein the target mapping information is information for a target mapping point of a target sub-grid in the simulation grid.

An electronic device provided by one of the embodiments of the present disclosure includes a processor, a memory, and a computer program stored in the memory and capable of running on the processor, wherein the computer program, when executed by the processor, implements steps of the rendering processing method as described above.

A computer-readable storage medium provided by one of the embodiments of the present disclosure has a computer program stored thereon, wherein the computer program, when executed by a processor, implements steps of the rendering processing method as described above.

BRIEF DESCRIPTION OF THE DRAWINGS

In order to illustrate the technical solutions of the present disclosure more clearly, the following will briefly introduce the drawings used in the description of the present disclosure. Obviously, the drawings in the following description are only some embodiments of the present disclosure. For those of ordinary skill in the art, other drawings can be acquired based on these drawings without creative work.

DETAILED DESCRIPTION

In order to make the above objects, features and advantages of the present disclosure more clearly understood, the present disclosure will be described in further detail below with reference to the drawings and specific embodiments. Obviously, the described embodiments are some, but not all, embodiments of the present disclosure. Based on the embodiments in the present disclosure, all other embodiments acquired by those of ordinary skill in the art without creative efforts shall fall within the protection scope of the present disclosure.

In the embodiments of the present disclosure, cloth simulation is involved. During the cloth simulation, for a rendering grid of the cloth, data (such as a vertex and a triangle index) in the rendering grid can be used to directly perform solving on the rendering grid. Rendering positions can be obtained through simulation calculation of vertices in the rendering grid, so as to subsequently make a cloth simulation effect.

However, the higher the number of vertices in the rendering grid for the virtual model's cloth in a game, the more calculation to be solved. The cloth simulation, as a kind of physical simulation effect with a large amount of calculation, often needs to compromise on the calculation efficiency and the simulation effect when the cloth is made, especially for mobile phones with the relatively weak computing capability, and if the rendering grid is directly used for simulation, the large amount of calculation will cause the game lag.

Moreover, when a two-layer rendering grid is used for the cloth simulation in the game, according to a conventional cloth simulation production method, the simulation calculation is performed on each layer of the rendering grid to produce the cloth simulation effect, which will result in penetration between the two layers of the rendering grid, and when a collision detection for the cloth simulation is performed in a mobile game, the amount of calculation will increase.

By applying the method of the embodiments of the present disclosure, the simulation calculation is performed by using a simulation grid with a smaller number of vertices than the rendering grid (i.e., a display grid), and then according to mapping information established between the rendering grid and the simulation grid, rendering positions for the rendering grid can be acquired through interpolation mapping for rendering, which reduces the calculation amount of the cloth simulation and improves the smoothness of the game running, and vertices of the rendering grid can be kept at a fixed distance relative to the simulation grid through the interpolation, avoiding the penetration upon the simulation of the rendering grid with two layers.

The following is a detailed description.

Figure 1:
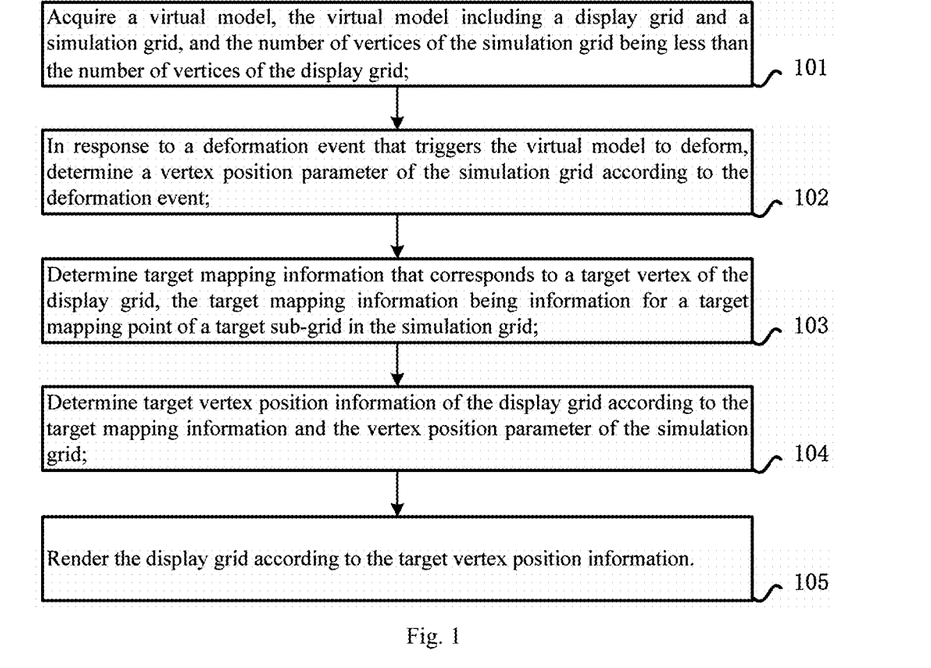
FIG. 1 is a flowchart of steps of a rendering processing method provided by an embodiment of the present disclosure.

Referring to FIG. 1, a flowchart of steps of a rendering processing method provided by an embodiment of the present disclosure is shown, and the rendering processing method may specifically include the following steps 101 to 105.

In the step 101, a virtual model is acquired, and the virtual model includes a display grid and a simulation grid, and the number of vertices of the simulation grid is less than the number of vertices of the display grid.

As an example, the display grid may be a grid for the virtual model, which may have a fine effect and may be a multi-layer grid, such as a two-layer display grid. The simulation grid may be a grid for the virtual model, which may have a simplified effect and can be a single-layer grid. The number of vertices of the simulation grid can be smaller than the number of vertices of the display grid. For example, a layer of simulation grid can be inserted in the middle of the two-layer display grid, and the number of vertices of the simulation grid is smaller than the number of vertices of the display grid.

During the rendering, the display grid for rendering and the simulation grid for simulation can be acquired for the virtual model to be rendered, and the number of vertices of the simulation grid is smaller than the number of vertices of the display grid.

Specifically, when the rendering is performed in a game, for a virtual model in the game to be rendered, the rendering grid (that is, the display grid) and a virtual grid (that is, the simulation grid) for a virtual object (that is, the virtual model) can be acquired, the rendering grid can be used for rendering to acquire a cloth simulation effect, and the virtual grid can be used for cloth simulation calculation.

When the cloth simulation is made, the grid for the virtual model can be triangular grid data, the triangular grid data can be a set of multiple triangles, and each triangle (triangular patch) has three vertices. The sum of the number of vertices of all triangles in the grid for the virtual model is taken as the total number of vertices of the grid, for example, the total number of vertices of the simulation grid is less than the total number of vertices of the display grid.

In the step 102, in response to a deformation event that triggers the virtual model to deform, a vertex position parameter of the simulation grid is determined according to the deformation event.

As an example, the deformation event may be a simulation processing for the simulation grid of the virtual model, and the simulation processing may cause the deformation of the simulation grid. The vertex position parameter of the simulation grid may include a position of the vertex of the deformed simulation grid. For example, when the game is running, the simulation processing can be performed on the simplified simulation grid to make the multiple triangles T in the simulation grid move, and then positions of three vertices after the movement and deformation can be obtained for each triangle T. The three vertices can be expressed as Ta, Tb, Tc.

For the rendering when the game is running, after the display grid and simulation grid for the virtual model are acquired, the simulation processing is performed on the simulation grid so as to obtain the vertex position parameter of the simulation grid after the simulation processing.

In the step 103, target mapping information that corresponds to a target vertex of the display grid is determined, and the target mapping information is information for a target mapping point of a target sub-grid in the simulation grid.

The target vertex can be one or more vertices of the display grid, which can be rendered in the game, and the target mapping information can be the information for the target mapping point of the target sub-grid in the simulation grid. A mapping between the target vertex in the display grid and the target mapping point in the simulation grid is established, and mapping information may be stored in a cloth resource, so that the mapping information (such as a mapping tuple) corresponding to the target vertex of the display grid can be acquired in the game. A mapping establishment process will be described in detail below, and will not be repeated here.

As an example, the target mapping point may be a mapping point in the simulation grid for the target vertex of the display grid, and the target sub-grid may be a grid in the simulation grid for the target mapping point. For example, a vertex P of the display grid may have a mapping point P' in the triangle T of the simulation grid.

After the display grid and the simulation grid are acquired, the target mapping information corresponding to the target vertex of the display grid can be acquired from the cloth resource of the game, and the target mapping information can be the information for the target mapping point of the target sub-grid in the simulation grid.

In practical applications, for each vertex of the display grid, a mapping tuple corresponding to this vertex can be queried in a cloth grid resource. For example, a mapping tuple of the vertex P of the display grid can be (dist, wx, wy, indexT), where dist can be a distance, wx and wy can be barycentric coordinate interpolation of the mapping point P' in the simulation grid for the vertex P, and indexT can be a triangle index of a triangle T in the simulation grid closest to the vertex P.

In the step 104, target vertex position information of the display grid is determined according to the target mapping information and the vertex position parameter of the simulation grid.

As an example, the target vertex position information of the display grid may be a position information of the target vertex. For example, after the simulation is performed on the simulation grid, the position of the mapping point P' in the simulation grid obtained through interpolation is mapped to the display grid to obtain the updated position information of the vertex P.

After the target mapping information corresponding to the target vertex is determined, since the target mapping information may have information on the target mapping point of the target sub-grid in the simulation grid, the target vertex position information corresponding to the target vertex in the display grid can be obtained through the mapping according to the target mapping information and the vertex position parameter of the simulation grid.

In the rendering for the game, the cloth simulation can be performed on the simulation grid. The cloth simulation effect can be realized by the change in the position of the vertex in the simulation grid corresponding to each frame of animation, and the vertex in the simulation grid can be the mapping point for the vertex in the display grid. Then the updated vertex position in the display grid can be obtained as the rendering position from the position information of the mapping point after movement in the simulation grid.

In an embodiment of the present disclosure, the step 104 may include the following sub-steps 11 to 13.

In the sub-step 11, target mapping point position information of the target mapping point is determined according to the target mapping information and the vertex position parameter of the simulation grid.

As an example, the target mapping point position information may be the position information of the target mapping point processed by simulation, for example, the position information of the mapping point P' in the simulation grid that is for the vertex P of the display grid after movement upon the simulation being performed on the simulation grid.

After the target mapping information corresponding to the target vertex is determined, since the target mapping information may have the information for the target mapping point, interpolation calculation can be performed for the target mapping point according to the target mapping information and the vertex position parameter of the simulation grid to obtain the target mapping point position information corresponding to the target mapping point.

In an embodiment of the present disclosure, the sub-step 11 may include the following sub-steps 111 to 112.

In the sub-step 111, a target sub-grid index is determined from the target mapping information, and the target sub-grid index is a sub-grid index corresponding to the target sub-grid in the simulation grid.

As an example, the target sub-grid index may be the sub-grid index corresponding to the target sub-grid in the simulation grid, for example, a triangle index corresponding to the triangle T in the simulation grid.

After the target mapping information corresponding to the target vertex is determined, the sub-grid index for the target vertex can be acquired from the target mapping information as the target sub-grid index.

Specifically, the mapping tuple corresponding to the vertex of the display grid can be queried from the cloth resource, the mapping tuple can have the triangle index indexT in the simulation grid for the vertex P of the display grid, and then indexT can be used as the target sub-grid index.

In the sub-step 112, the target mapping point position information of the target mapping point is determined according to the target sub-grid index and the vertex position parameter of the simulation grid.

After the target sub-grid index is determined, the information of the target mapping point in the simulation grid can be determined according to the target sub-grid index and the vertex position parameter of the simulation grid, and then the interpolation calculation can be performed for the target mapping point to obtain the target mapping point position information corresponding to the target mapping point.

In an embodiment of the present disclosure, the sub-step 112 may include the following sub-steps 1121 to 1122.

In the sub-step 1121, a target barycentric coordinate is determined from the target mapping information, and the target barycentric coordinate is a barycentric coordinate corresponding to the target mapping point in the target sub-grid.

As an example, the target barycentric coordinate may be the barycentric coordinate corresponding to the target mapping point in the target sub-grid, such as wx, wy, and wz in the mapping tuple.

After the target mapping information corresponding to the target vertex is determined, the barycentric coordinate of the target vertex can be acquired from the target mapping information as the target barycentric coordinate.

Specifically, the mapping tuple corresponding to the vertex of the display grid can be queried from the cloth resource, the mapping tuple can have barycentric coordinate interpolation wx, wy of the mapping point P' in the simulation grid for the vertex P of the display grid, and then wx, wy can be used as the target barycentric coordinates.

In the sub-step 1122, the target mapping point position information of the target mapping point in the target sub-grid is determined in combination with the target sub-grid index, the target barycentric coordinate and the vertex position parameter of the simulation grid.

The vertex position parameter of the simulation grid may include a position parameter of a vertex of the target sub-grid, for example, three vertex positions corresponding to the triangle T in the simulation grid.

After the target barycentric coordinate is acquired, the target mapping point position information of the target mapping point in the target sub-grid can be obtained through the interpolation calculation in combination with the target sub-grid index, the target barycentric coordinate, and the vertex position parameter of the simulation grid.

For example, the mapping tuple (dist, wx, wy, indexT) of the vertex P of the display grid can be obtained through query, and the triangle T in the simulation grid can be determined according to the triangle index indexT. The positions of three vertices of the triangle T after movement can be acquired, and then the position of the mapping point P' in the simulation grid for the vertex P of the display grid can be obtained through interpolation. Specifically, the interpolation calculation can be performed in the following manner:

$$P'(wx*Ta+wy*Tb+(1-wx-wy)*Tc)$$

where Ta, Tb, Tc can be the positions of the three vertices of the triangle T in the simulation grid after movement, and wx and wy are the barycentric coordinate interpolation of the mapping point P' in the simulation grid for the vertex P of the display grid.

In an example, the mapping tuple corresponding to the target vertex can be inquired, and the triangle T in the simulation grid can be determined according to the triangle index T in the mapping tuple, and then the positions of the three vertices of the triangle T (such as Ta, Tb, Tc) can be acquired. The positions of these three vertices can be positions of the three vertices of the triangle T in the simulation grid after the movement when the simulation is performed on the simulation grid.

In the sub-step 12, a target distance vector is determined from the target mapping information, and the target distance vector is a distance vector between the target vertex and the target mapping point.

As an example, the target distance vector may be the distance vector between the target vertex and the target mapping point, such as dist in the mapping tuple.

After the target mapping information corresponding to the target vertex is determined, the distance vector between the target vertex and the target mapping point can be acquired from the target mapping information as the target distance vector.

Specifically, the mapping tuple corresponding to the vertex of the displayed grid can be queried from the cloth resource, and the mapping tuple has the distance vector dist between the vertex P and the mapping point P', and then the dist can be used as the target distance vector.

In the sub-step 13, the target vertex position information of the display grid is determined according to the target distance vector and the target mapping point position information.

In a specific implementation, the target distance vector and the target mapping point position information corresponding to the target mapping point in the simulation grid can be used to obtain the target vertex position information corresponding to the target vertex in the display grid by interpolation.

In an embodiment of the present disclosure, the sub-step 13 may include the following sub-steps 131 to 132.

In the sub-step 131, a target normal vector for the target sub-grid is determined.

The target normal vector may be a normal vector of the target sub-grid in the simulation grid, for example, normal vectors of the three vertices corresponding to the triangle in the simulation grid.

After the target mapping information corresponding to the target vertex is determined, the target sub-grid index can be acquired from the target mapping information, and then the target sub-grid can be determined by using the target sub-grid index to acquire the normal vector of the vertex of the target sub-grid.

In practical applications, the mapping tuple corresponding to the target vertex can be queried, and the triangle T in the simulation grid can be determined according to the triangle index indexT in the mapping tuple, and then the normal vectors (such as Na, Nb, Nc) of the three vertices of the triangle T can be acquired. The normal vector of the triangle T can be an average of the normal vectors of all adjacent triangles of the triangle T. And then the normal vector N' of the mapping point P' can be obtained by interpolation. Specifically, the interpolation calculation can be performed in the following manner:

$$N'(wx*Na+wy*Nb+(1-wx-wy)*Nc)$$

where Na, Nb, Nc can be normal vectors of the three vertices of the triangle T in the simulation grid after movement, and wx and wy can be barycentric coordinate interpolation of the mapping point P' in the simulation grid for the vertex P of the display grid.

In the sub-step 132, the target vertex position information of the display grid is determined in combination with the target normal vector, the target distance vector, and the target mapping point position information.

In practical applications, the mapping tuple of the vertex P of the display grid can be obtained through query, and then the triangle T in the simulation grid can be determined according to the triangle index indexT. The normal vector of the mapping point P' can be acquired from the normal vectors of the three vertices of the triangle T, the position of the mapping point P' in the simulation grid for the vertex P of the display grid can be acquired by interpolation, and then the updated position of the vertex P in the display grid can be acquired by interpolation. Specifically, the interpolation calculation can be performed in the following manner:

$$P'+dist*N'$$

where P' can be a position of the mapping point acquired by interpolation, dist can be a distance vector between the vertex P and the mapping point P', and N' can be a normal vector of the mapping point P'.

In the step 105, the display grid is rendered according to the target vertex position information.

After the target vertex position information corresponding to the target vertex is determined, the target vertex position information can be used to determine a rendering position of the target vertex in the display grid so as to render the display grid.

In an example, the simulation calculation is performed by using the simulation grid with a number of vertices smaller than that of the display grid, and then according to the mapping information established between the display grid and the simulation grid, the rendering position for the display grid can be acquired through interpolation mapping for rendering, so that the vertex of the display grid can keep a fixed distance from the simulation grid through interpolation, avoiding the penetration upon the simulation of the two-layer display grid.

Figure 2A:
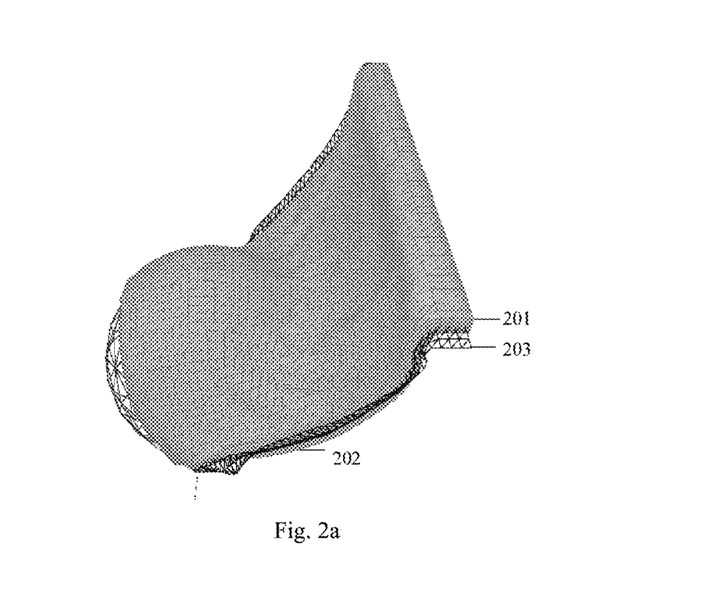
FIG. 2a is a schematic diagram of an example of rendering processing provided by an embodiment of the present disclosure.
Figure 2B:
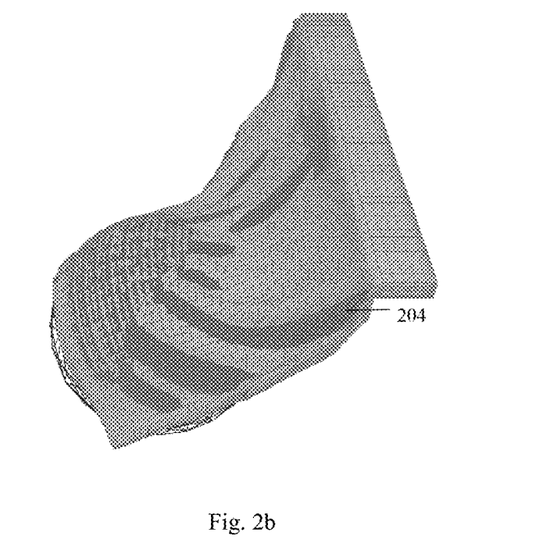
FIG. 2b is a schematic diagram of an example of a penetration effect provided by an embodiment of the present disclosure.

For example, as shown in FIG. 2a, since the vertex of the display grid (an upper display grid 201 and a lower display grid 202 as shown in FIG. 2a) keeps a fixed distance relative to the simulation grid (203 in FIG. 2a), the penetration upon the simulation of the two-layer display grid (204 in FIG. 2b is the penetration effect) is avoided.

In the embodiments of the present disclosure, the virtual model including the display grid and the simulation grid is acquired, and the number of vertices of the simulation grid is less than the number of vertices of the display grid; in response to the deformation event that triggers the virtual model to deform, the vertex position parameter of the simulation grid is determined according to the deformation event, and then the target mapping information that corresponds to the target vertex of the display grid is determined, and the target mapping information is the information for the target mapping point of the target sub-grid in the simulation grid; the target vertex position information of the display grid is determined according to the target mapping information and the vertex position parameter of the simulation grid; and the display grid is rendered according to the target vertex position information, thereby realizing the optimization for the cloth simulation of the virtual model. By means of mapping the vertex of the display grid from the simulation grid with the smaller number of vertices, the display grid is then to be rendered, so as to reduce the calculation amount of the cloth simulation and improve the smoothness of game running.

Figure 3:
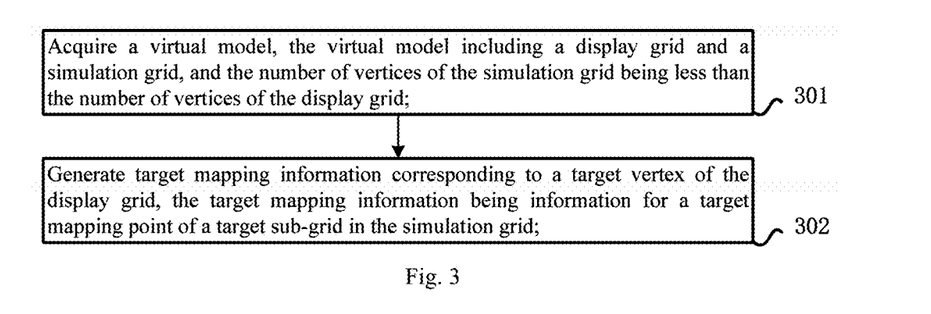
FIG. 3 is a flowchart of steps of another rendering processing method provided by an embodiment of the present disclosure.

Referring to FIG. 3, a flowchart of steps of another rendering processing method provided by an embodiment of the present disclosure is shown, and the rendering processing method may specifically include the following steps 301 to 302.

In the step 301, a virtual model is acquired, the virtual model includes a display grid and a simulation grid, and the number of vertices of the simulation grid is less than the number of vertices of the display grid.

During the rendering, the display grid and the simulation grid can be made for the virtual model to be rendered. The display grid can be used for rendering, and the simulation grid can be used for simulation, and the number of vertices of the simulation grid is smaller than that of the display grid.

In the step 302, target mapping information corresponding to a target vertex of the display grid is generated, and the target mapping information is information for a target mapping point of a target sub-grid in the simulation grid.

After the display grid and the simulation grid are acquired, mapping between the target vertex in the display grid and a target mapping point in the simulation grid can be established, and mapping information can be stored in a cloth resource as the target mapping information corresponding to the target vertex of the display grid.

In an embodiment of the present disclosure, the target mapping information may include a target sub-grid index corresponding to the target sub-grid, and the step 302 may include the following sub-steps 21 to 22.

In the sub-step 21, the target sub-grid corresponding to the target vertex of the display grid is determined in the simulation grid.

As an example, the target sub-grid may be a sub-grid in the simulation grid for the target vertex of the display grid, such as a triangle T in the simulation grid closest to a vertex P.

After the display grid and the simulation grid are acquired, the target sub-grid corresponding to the target vertex of the display grid may be determined from multiple sub-grids of the simulation grid.

In an embodiment of the present disclosure, the sub-step 21 may include the following sub-steps 211 to 212.

In the sub-step 211, for the target vertex of the display grid, distance information corresponding to a sub-grid in the simulation grid is determined.

As an example, the distance information may be distance information between the target vertex of the display grid and the multiple sub-grids in the simulation grid.

After the display grid and the simulation grid are acquired, for the target vertex of the display grid, the distance information between the target vertex and the multiple sub-grids in the simulation grid can be acquired in the simulation grid.

Specifically, for the vertex P of the display grid, all triangles on the simulation grid can be traversed, and a spatial distance from the vertex P to each triangle can be calculated, for example, distances from the vertex P to each vertex and each edge of each triangle and a triangle plane.

In the sub-step 212, a sub-grid corresponding to the smallest distance information is determined as the target sub-grid corresponding to the target vertex of the display grid.

In practical applications, the display grid can have multiple vertices. For each vertex, all triangles on the simulation grid can be traversed, a spatial distance from this vertex to each triangle can be calculated, and then a triangle (a triangular patch) with the smallest spatial distance for the vertex can be found, for example, the vertex P of the display grid corresponds to the triangle T with the smallest spatial distance.

In the sub-step 22, the target sub-grid index corresponding to the target sub-grid is determined.

After the target sub-grid is determined, a sub-grid index corresponding to the target sub-grid can be used as the target sub-grid index, for example, the triangle index indexT.

In an embodiment of the present disclosure, the target mapping information may include a target barycentric coordinate corresponding to the target mapping point, and the step 302 may further include the following sub-steps 31 to 32.

In the sub-step 31, the target mapping point corresponding to the target vertex is determined in the target sub-grid.

After the display grid and the simulation grid are acquired, the target sub-grid corresponding to the target vertex of the display grid can be determined from the multiple sub-grids of the simulation grid, and then the target mapping point corresponding to the target vertex can be determined in the target sub-grid. For example, after the triangle T of the vertex P in the simulation grid is acquired, the mapping P' of the vertex P being projected to the plane where the triangle T is located can be obtained.

In the sub-step 32, the target barycentric coordinate corresponding to the target mapping point is determined.

After the target mapping point is determined, the barycentric coordinate of the target mapping point relative to the vertex of the target sub-grid can be acquired as the target barycentric coordinate. For example, the barycentric coordinate interpolation of the mapping point P' relative to the three vertices of the triangle T are wx, wy, wz, where wx+wy+wz=1.0.

In an embodiment of the present disclosure, the target mapping information may include a target distance vector between the target vertex and the target mapping point, and the step 302 may further include the following sub-steps:

the target distance vector between the target vertex and the target mapping point is determined.

After the display grid and the simulation grid are acquired, the target sub-grid corresponding to the target vertex of the display grid can be determined from the multiple sub-grids of the simulation grid, and then the target mapping point corresponding to the target vertex can be determined in the target sub-grid, so as to use a distance vector between the target vertex and the target mapping point as the target distance vector.

In practical applications, a distance dist between the vertex P and the mapping point P' can be calculated, and dist can have a symbol to indicate a direction of the vertex P relative to a plane of the triangle T. For example, the vertex P is the upper display grid for the plane of the triangle T of the simulation grid, or the lower display grid for the plane of the triangle T of the simulation grid, In an example, after the closest triangle T in the simulation grid for the vertex P of the display grid is determined, the mapping point P' of the vertex P being projected on the plane where the triangle T is located can be obtained, and then the distance dist between the vertex P and the mapping point P' can be calculated. The barycentric coordinate interpolation wx, wy, wz of P' relative to the three vertices of the triangle T can be acquired, and a relationship of the three barycentric coordinate interpolation is wx+wy+wz=1.0. The triangle index indexT of the triangle T in the simulation grid can be recorded to obtain the mapping tuple (dist, wx, wy, indexT) for the vertex P of the display grid, and save the mapping tuple in the cloth grid resource.

In the embodiments of the present disclosure, the virtual model including the display grid and the simulation grid is acquired, the number of vertices of the simulation grid is less than the number of vertices of the display grid; and then the target mapping information corresponding to the target vertex of the display grid is generated, and the target mapping information is the information for the target mapping point of the target sub-grid in the simulation grid, thereby realizing the optimization for the cloth simulation of the virtual model; in addition, the mapping information between the simulation grid with the smaller number of vertices and the display grid is established to be used for the subsequent rending for the display grid, so as to reduce the calculation amount of the cloth simulation and improve the smoothness of game running, and the vertex of the display grid can keep a fixed distance from the simulation grid through interpolation, avoiding the penetration upon the simulation of the two-layer display grid.

It should be noted that, as to the method embodiments, for the sake of simple description, they are all expressed as a series of action combinations, but one of ordinary skill in the art should understand that the embodiments of the present disclosure are not limited to the described action sequence, and in accordance with the embodiments of the present disclosure, some steps can be performed in other sequences or concurrently. And further, it should be also understood by one of ordinary skill in the art that the embodiments described in the specification are all preferred embodiments, and the actions involved are not essentially required by embodiments of the present disclosure.

Figure 4:
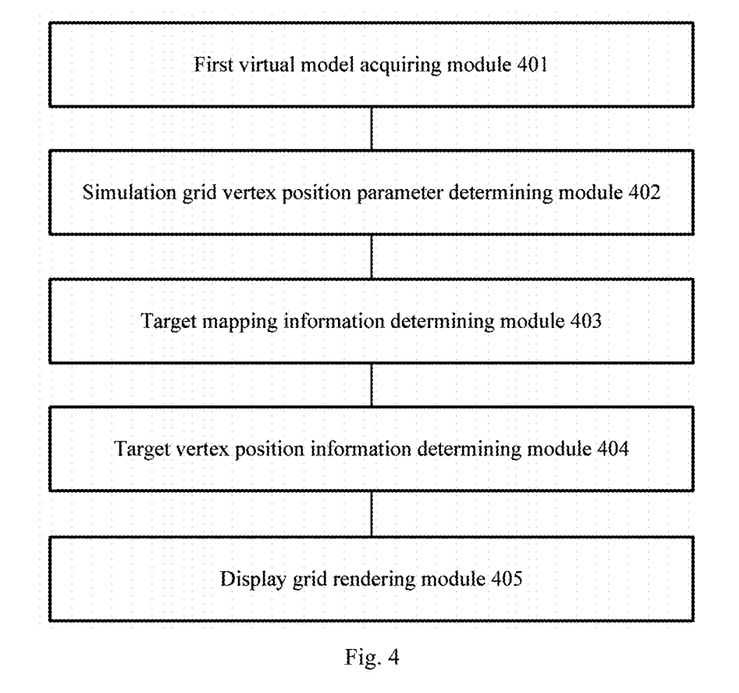
FIG. 4 is a schematic structural diagram of a rendering processing apparatus provided by an embodiment of the present disclosure.

Referring to FIG. 4, a schematic structural diagram of a rendering processing apparatus provided by an embodiment of the present disclosure is shown, and the rendering processing apparatus may specifically include the following modules:

- a first virtual model acquiring module 401, configured to acquire a virtual model, the virtual model includes a display grid and a simulation grid, and the number of vertices of the simulation grid is less than the number of vertices of the display grid;
- a simulation grid's vertex position parameter determining module 402, configured to, in response to a deformation event that triggers the virtual model to deform, determine a vertex position parameter of the simulation grid according to the deformation event;
- a target mapping information determining module 403, configured to determine target mapping information that corresponds to a target vertex of the display grid, and the target mapping information is information for a target mapping point of a target sub-grid in the simulation grid;
- a target vertex position information determining module 404, configured to determine target vertex position information of the display grid according to the target mapping information and the vertex position parameter of the simulation grid; and
- a display grid rendering module 405, configured to render the display grid according to the target vertex position information.

In an embodiment of the present disclosure, the target vertex position information determining module 404 includes:

- a target mapping point position information determining sub-module, configured to determine target mapping point position information of the target mapping point according to the target mapping information and the vertex position parameter of the simulation grid;
- a first target distance vector determining sub-module, configured to determine a target distance vector from the target mapping information, and the target distance vector is a distance vector between the target vertex and the target mapping point; and
- a target vertex position information determining sub-module, configured to determine the target vertex position information of the display grid according to the target distance vector and the target mapping point position information.

In an embodiment of the present disclosure, the target vertex position information determining sub-module includes:

- a target normal vector determining unit, configured to determine a target normal vector for the target sub-grid; and
- a target vertex position information determining unit, configured to determine the target vertex position information of the display grid in combination with the target normal vector, the target distance vector, and the target mapping point position information.

In an embodiment of the present disclosure, the target mapping point position information determining sub-module includes:

- a target sub-grid index determining unit, configured to determine a target sub-grid index from the target mapping information, and the target sub-grid index is a sub-grid index corresponding to the target sub-grid in the simulation grid; and
- a target mapping point position information determining unit, configured to determine the target mapping point position information of the target mapping point according to the target sub-grid index and the vertex position parameter of the simulation grid.

In an embodiment of the present disclosure, the target mapping point position information determining unit includes:

- a target barycentric coordinate determining sub-unit, configured to determine a target barycentric coordinate from the target mapping information, and the target barycentric coordinate is a barycentric coordinate corresponding to the target mapping point in the target sub-grid; and
- a target mapping point position information determining sub-unit, configured to determine the target mapping point position information of the target mapping point in the target sub-grid in combination with the target sub-grid index, the target barycentric coordinate and the vertex position parameter of the simulation grid.

In the embodiments of the present disclosure, the virtual model including the display grid and the simulation grid is acquired, and the number of vertices of the simulation grid is less than the number of vertices of the display grid; in response to the deformation event that triggers the virtual model to deform, the vertex position parameter of the simulation grid is determined according to the deformation event, and then the target mapping information that corresponds to the target vertex of the display grid is determined, and the target mapping information is the information for the target mapping point of the target sub-grid in the simulation grid; the target vertex position information of the display grid is determined according to the target mapping information and the vertex position parameter of the simulation grid; and the display grid is rendered according to the target vertex position information, thereby realizing the optimization for the cloth simulation of the virtual model; by means of mapping the vertex of the display grid from the simulation grid with the smaller number of vertices, the display grid is then to be rendered, so as to reduce the calculation amount of the cloth simulation and improve the smoothness of game running.

Figure 5:
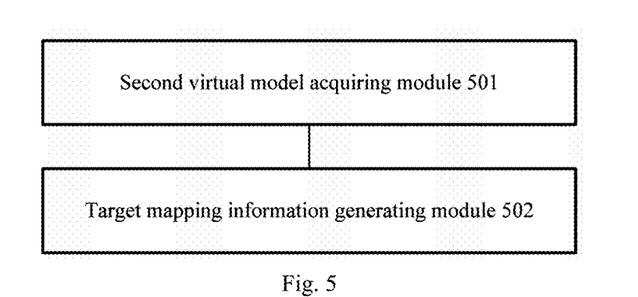
FIG. 5 is a schematic structural diagram of another rendering processing apparatus provided by an embodiment of the present disclosure.

Referring to FIG. 5, a schematic structural diagram of another rendering processing apparatus provided by an embodiment of the present disclosure is shown, and the rendering processing apparatus may specifically include the following modules:

- a second virtual model acquiring module 501, configured to acquire a virtual model, the virtual model includes a display grid and a simulation grid, and the number of vertices of the simulation grid is less than the number of vertices of the display grid; and
- a target mapping information generating module 502, configured to generate target mapping information corresponding to a target vertex of the display grid, and the target mapping information is information for a target mapping point of a target sub-grid in the simulation grid.

In an embodiment of the present disclosure, the target mapping information includes a target sub-grid index corresponding to the target sub-grid, and the target mapping information generating module 502 includes:

- a target sub-grid determining sub-module, configured to determine the target sub-grid corresponding to the target vertex of the display grid in the simulation grid; and
- a target sub-grid index determining sub-module, configured to determine the target sub-grid index corresponding to the target sub-grid.

In an embodiment of the present disclosure, the target sub-grid determining sub-module includes:

- a distance information determining unit, configured to, for the target vertex of the display grid, determine distance information corresponding to a sub-grid in the simulation grid; and
- a target sub-grid determining unit, configured to determine a sub-grid corresponding to the smallest distance information as the target sub-grid corresponding to the target vertex of the display grid.

In an embodiment of the present disclosure, the target mapping information includes a target barycentric coordinate corresponding to the target mapping point, and the target mapping information generating module 502 includes:

- a target mapping point determining sub-module, configured to determine the target mapping point corresponding to the target vertex in the target sub-grid; and
- a target barycentric coordinate determining sub-module, configured to determine the target barycentric coordinate corresponding to the target mapping point.

In an embodiment of the present disclosure, the target mapping information includes a target distance vector between the target vertex and the target mapping point, and the target mapping information generating module 502 includes:

- a second target distance vector determining sub-module, configured to determine the target distance vector between the target vertex and the target mapping point.

In the embodiments of the present disclosure, the virtual model including the display grid and the simulation grid is acquired, the number of vertices of the simulation grid is less than the number of vertices of the display grid; and then the target mapping information corresponding to the target vertex of the display grid is generated, and the target mapping information is the information for the target mapping point of the target sub-grid in the simulation grid, thereby realizing the optimization for the cloth simulation of the virtual object; in addition, the mapping information between the simulation grid with the smaller number of vertices and the display grid is established to be used for the subsequent rending for the display grid, so as to reduce the calculation amount of the cloth simulation and improve the smoothness of game running, and the vertex of the display grid can keep a fixed distance from the simulation grid through interpolation, avoiding the penetration upon the simulation of the two-layer display grid.

Figure 6:
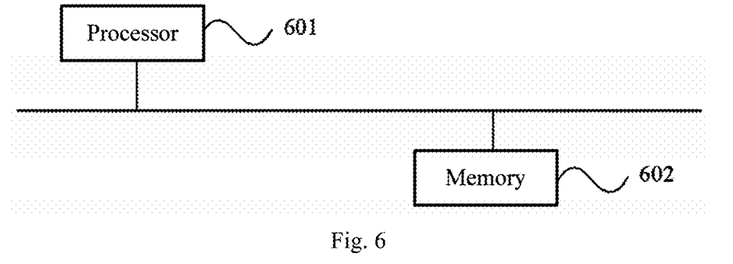
FIG. 6 is a schematic structural diagram of an electronic device according to an embodiment of the present disclosure.

Referring to FIG. 6, a schematic structural diagram of an electronic device provided by an embodiment of the present disclosure is shown, the electronic device may specifically include a processor 601, a memory 602, and a computer program stored in the memory and capable of running on the processor. The computer program, when executed by the processor, may implement the rendering processing method described above.

Figure 7:
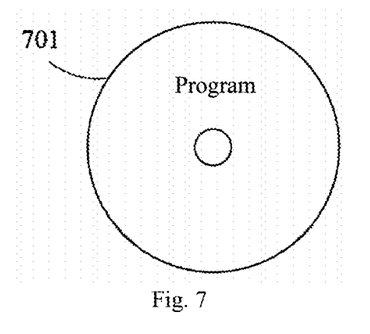
FIG. 7 is a schematic structural diagram of a computer-readable storage medium provided by an embodiment of the present disclosure.

Referring to FIG. 7, a schematic structural diagram of a computer-readable storage medium provided by an embodiment of the present disclosure is shown, the computer-readable storage medium 701 can store a computer program, and the computer program, when executed by a processor, may implement the rendering processing method described above.

For the apparatus embodiments, since it is substantially similar to the above method embodiments, the description is relatively simple, and relevant parts can be referred to the description of the method embodiments.

The various embodiments in the present specification are described in a progressive manner, and description of each embodiment focuses on differences from other embodiments, and the same or the similar parts between the various embodiments can be referred to each other.

One ordinary skill in the art will appreciate that embodiments of the disclosed embodiments can be provided as a method, apparatus, or computer program product. Thus, embodiments of the present disclosure can take the form of an entirely hardware embodiment, an entirely software embodiment, or a combination of software and hardware. Moreover, embodiments of the present disclosure can take the form of a computer program product embodied on one or more computer usable storage medium (including and not limited to disk storage, CD-ROM, optical storage, etc.) including computer usable program code.

Embodiments of the present disclosure are described with reference to flowchart and/or block diagrams of methods, terminal devices (systems), and computer program products according to embodiments of the present disclosure. It should be understood that each process and/or block of the flowchart or the block diagrams, and a combination of process and/or block of the flowchart or the block diagrams by computer program instructions can be implemented. The computer instructions can be provided to a general purpose computer, special purpose computer, embedded processor or other programmable data processing terminal device to produce a machine such that instructions executed by a processor of a computer or other programmable data processing terminal device are configured to produce a device for implementing the functions specified in one or more of the processes in the flowchart or in one or more blocks of the diagram blocks.

The computer program instructions can further be stored in a computer readable memory that can direct a computer or other programmable data processing terminal device to operate in a particular manner, such that the instructions stored in the computer readable memory produce a product including the instruction device. The instruction device implements the functions specified in one or more of the processes in the flowchart or in one or more blocks of the diagram blocks.

These computer program instructions can further be loaded onto a computer or other programmable data processing terminal device such that a series of operational steps are performed on the computer or other programmable terminal device to produce computer-implemented processing, such that the instructions executed on the computer or other programmable terminal device provide steps for implementing the functions specified in one or more of the processes in the flowchart or in one or more blocks of the diagram blocks.

While the preferred embodiment of the present invention has been described, it will be apparent that one of ordinary skill in the art can make further changes and modifications to the embodiments upon learning the essential inventive concept of the present disclosure. Therefore, the appended claims are intended to be interpreted as including the preferred embodiments and the modifications and variations falling into the scope of the embodiments.

Finally, it should also be noted that in this context, relational terms such as first and second are used merely to distinguish one entity or operation from another entity or operation, and do not necessarily require or imply that there is relation or sequence between these entities or operations. Furthermore, the terms "includes" or "including" or "containing" or any other variations that are intended to encompass a non-exclusive inclusion, such that a process, method, article, or terminal device that includes a plurality of elements includes not only those elements but also other elements that are named specifically, or include elements inherent to such a process, method, article, or terminal device. An element defined by the phrase "including a . . . " does not exclude the presence of additional identical elements in the process, method, article, or terminal device that includes the element, without further limitation.

The rendering processing method and apparatus, the electronic device and the storage medium as provided are described in detail above, and the principles and the embodiments of the present disclosure are depicted through specific examples. However, the description of the embodiments is merely provided for understanding the gist of the methods and the apparatuses of the present disclosure. And based on the gist of the present disclosure, modifications in the specific embodiments and in the applications of the present disclosure can easily occur to one of ordinary skill in the art. And in general, the contents contained in die description cannot be construed as a limit to the present disclosure.

What is claimed is:

1. A rendering processing method, comprising:
acquiring a virtual model, wherein the virtual model comprises a display grid and a simulation grid, and a number of vertices of the simulation grid is less than a number of vertices of the display grid;
in response to a deformation event that triggers the virtual model to deform, determining a vertex position parameter of the simulation grid according to the deformation event;
determining target mapping information that corresponds to a target vertex of the display grid, wherein the target mapping information is information for a target mapping point of a target sub-grid in the simulation grid;
determining target vertex position information of the display grid according to the target mapping information and the vertex position parameter of the simulation grid; and
rendering the display grid according to the target vertex position information; wherein
the determining the target vertex position information of the display grid according to the target mapping information and the vertex position parameter of the simulation grid comprises:
determining target mapping point position information of the target mapping point according to the target mapping information and the vertex position parameter of the simulation grid;
determining a target distance vector from the target mapping information, wherein the target distance vector is a distance vector between the target vertex and the target mapping point; and
determining the target vertex position information of the display grid according to the target distance vector and the target mapping point position information.

2. The method according to claim 1, wherein the determining the target vertex position information of the display grid according to the target distance vector and the target mapping point position information comprises:
determining a target normal vector for the target sub-grid; and
determining the target vertex position information of the display grid in combination with the target normal vector, the target distance vector, and the target mapping point position information.

3. The method according to claim 2, wherein the determining the target normal vector for the target sub-grid comprises:
obtaining a target sub-grid index from the target mapping information, wherein the target sub-grid index is a sub-grid index corresponding to the target sub-grid in the simulation grid;
determining the target normal vector for the target sub-grid by using the target sub-grid index.

4. The method according to claim 2, wherein the determining the target vertex position information of the display grid in combination with the target normal vector, the target distance vector, and the target mapping point position information comprises:
calculating the target vertex position information of the display grid by using the following formula:
P'+dist*N', wherein P' is the target mapping point position information, dist is the target distance vector, and N' is the target normal vector.

5. The method according to claim 1, wherein the determining the target mapping point position information of the target mapping point according to the target mapping information and the vertex position parameter of the simulation grid comprises:
determining a target sub-grid index from the target mapping information, wherein the target sub-grid index is a sub-grid index corresponding to the target sub-grid in the simulation grid; and
determining the target mapping point position information of the target mapping point according to the target sub-grid index and the vertex position parameter of the simulation grid.

6. The method according to claim 5, wherein the determining the target mapping point position information of the target mapping point according to the target sub-grid index and the vertex position parameter of the simulation grid comprises:
determining a target barycentric coordinate from the target mapping information, wherein the target barycentric coordinate is a barycentric coordinate corresponding to the target mapping point in the target sub-grid; and determining the target mapping point position information of the target mapping point in the target sub-grid in combination with the target sub-grid index, the target barycentric coordinate and the vertex position parameter of the simulation grid.

7. The method according to claim 6, wherein the determining the target mapping point position information of the target mapping point in the target sub-grid in combination with the target sub-grid index, the target barycentric coordinate and the vertex position parameter of the simulation grid comprises:

determining the target mapping point position information of the target mapping point in the target sub-grid through interpolation calculation in combination with the target sub-grid index, the target barycentric coordinate, and the vertex position parameter of the simulation grid.

8. The method according to claim 5, wherein the determining the target sub-grid index from the target mapping information comprises:

determining a sub-grid index for the target vertex from the target mapping information as the target sub-grid index.

9. The method according to claim 1, wherein the vertex position parameter of the simulation grid comprises a position of a vertex of the simulation grid after deformation.

10. The method according to claim 1, wherein determining the vertex position parameter of the simulation grid according to the deformation event comprises:

performing a simulation processing on the simulation grid;

determining the vertex position parameter of the simulation grid after the simulation processing.

11. The method according to claim 1, wherein the deformation event is a simulation processing for the simulation grid of the virtual model, and the simulation processing causes the deformation of the simulation grid.

12. The method according to claim 1, wherein the target vertex is one or more vertices of the display grid.

13. The method according to claim 1, wherein the target mapping point is a mapping point in the simulation grid for the target vertex of the display grid, and the target sub-grid is a grid in the simulation grid for the target mapping point.

14. A rendering processing method, comprising:
acquiring a virtual model, wherein the virtual model comprises a display grid and a simulation grid, and a number of vertices of the simulation grid is less than a number of vertices of the display grid; and generating target mapping information corresponding to a target vertex of the display grid, wherein the target mapping information is information for a target mapping point of a target sub-grid in the simulation grid; wherein the target mapping information comprises a target distance vector between the target vertex and the target mapping point, and the generating the target mapping information corresponding to the target vertex of the display grid comprises:

determining the target distance vector between the target vertex and the target mapping point.

15. The method according to claim 14, wherein the target mapping information comprises a target sub-grid index corresponding to the target sub-grid, and the generating the target mapping information corresponding to the target vertex of the display grid comprises:

determining the target sub-grid corresponding to the target vertex of the display grid in the simulation grid; and determining the target sub-grid index corresponding to the target sub-grid.

16. The method according to claim 15, wherein the determining the target sub-grid corresponding to the target vertex of the display grid in the simulation grid comprises:

for the target vertex of the display grid, determining distance information corresponding to a sub-grid in the simulation grid; and determining a sub-grid corresponding to the smallest distance information as the target sub-grid corresponding to the target vertex of the display grid.

17. The method according to claim 14, wherein the target mapping information comprises a target barycentric coordinate corresponding to the target mapping point, and the generating the target mapping information corresponding to the target vertex of the display grid comprises:

determining the target mapping point corresponding to the target vertex in the target sub-grid; and determining the target barycentric coordinate corresponding to the target mapping point.

18. An electronic device, comprising a processor, a memory and a computer program stored in the memory and capable of running on the processor, wherein the processor, through executing the computer program, is configured to:

acquire a virtual model, wherein the virtual model comprises a display grid and a simulation grid, and a number of vertices of the simulation grid is less than a number of vertices of the display grid;

in response to a deformation event that triggers the virtual model to deform, determine a vertex position parameter of the simulation grid according to the deformation event;

determine target mapping information that corresponds to a target vertex of the display grid, wherein the target mapping information is information for a target mapping point of a target sub-grid in the simulation grid;

determine target vertex position information of the display grid according to the target mapping information and the vertex position parameter of the simulation grid; and render the display grid according to the target vertex position information; wherein the processor is specifically configured to:
determine target mapping point position information of the target mapping point according to the target mapping information and the vertex position parameter of the simulation grid;

determine a target distance vector from the target mapping information, wherein the target distance vector is a distance vector between the target vertex and the target mapping point; and determine the target vertex position information of the display grid according to the target distance vector and the target mapping point position information.

* * * * *